(12) United States Patent
Ramakrishnan

(10) Patent No.: US 10,282,021 B2
(45) Date of Patent: May 7, 2019

(54) INPUT OBJECT BASED INCREASE IN GROUND MASS STATE

(71) Applicant: Synaptics Incorporated, San Jose, CA (US)

(72) Inventor: Shubha Ramakrishnan, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 11 days.

(21) Appl. No.: 15/625,778

(22) Filed: Jun. 16, 2017

(65) Prior Publication Data
US 2018/0364854 A1 Dec. 20, 2018

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
USPC ........................................................ 345/174
See application file for complete search history.

(56) References Cited

U.S. PATENT DOCUMENTS

| | | | | |
|---|---|---|---|---|
| 2010/0292945 | A1* | 11/2010 | Reynolds | G06F 3/044 702/65 |
| 2013/0030740 | A1* | 1/2013 | Bulea | G06F 3/0416 702/65 |
| 2013/0057503 | A1* | 3/2013 | Hristov | G06F 3/044 345/174 |
| 2014/0085263 | A1* | 3/2014 | Yilmaz | G06F 3/044 345/174 |
| 2014/0267128 | A1* | 9/2014 | Bulea | G06F 3/044 345/174 |
| 2015/0015539 | A1* | 1/2015 | Fotopoulos | G06F 3/044 345/174 |
| 2015/0277618 | A1* | 10/2015 | Bulea | G06F 3/0418 345/174 |
| 2015/0277619 | A1* | 10/2015 | Goudarzi | G06F 3/0418 345/174 |
| 2015/0378467 | A1* | 12/2015 | Hoch | G06F 3/044 345/174 |

* cited by examiner

*Primary Examiner* — Chineyere D Wills-Burns
(74) *Attorney, Agent, or Firm* — Ferguson Braswell Fraser Kubasta PC

(57) ABSTRACT

Increasing ground mass state of an input device is disclosed. Increasing the ground mass state includes driving sensor electrodes to acquire first measurements of a sensing region of the input device, and driving a first subset of the sensor electrodes while a second subset is coupled to device ground to acquire second measurements of a portion of the sensing region. Increasing the ground mass state further includes determining a location of an input object in the sensing region using the first measurements, determining the second subset corresponds to the location of the first input object in the sensing region, and coupling the second subset to device ground when driving the first subset in response to the second subset corresponding to the location of the first input object.

17 Claims, 5 Drawing Sheets

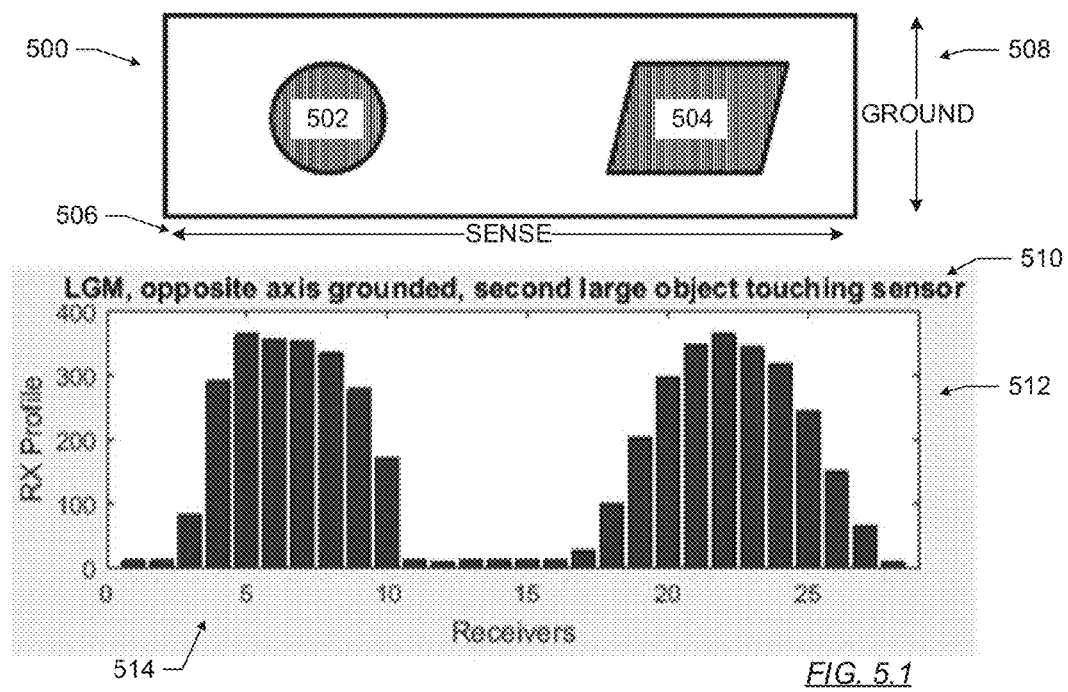
FIG. 5.1
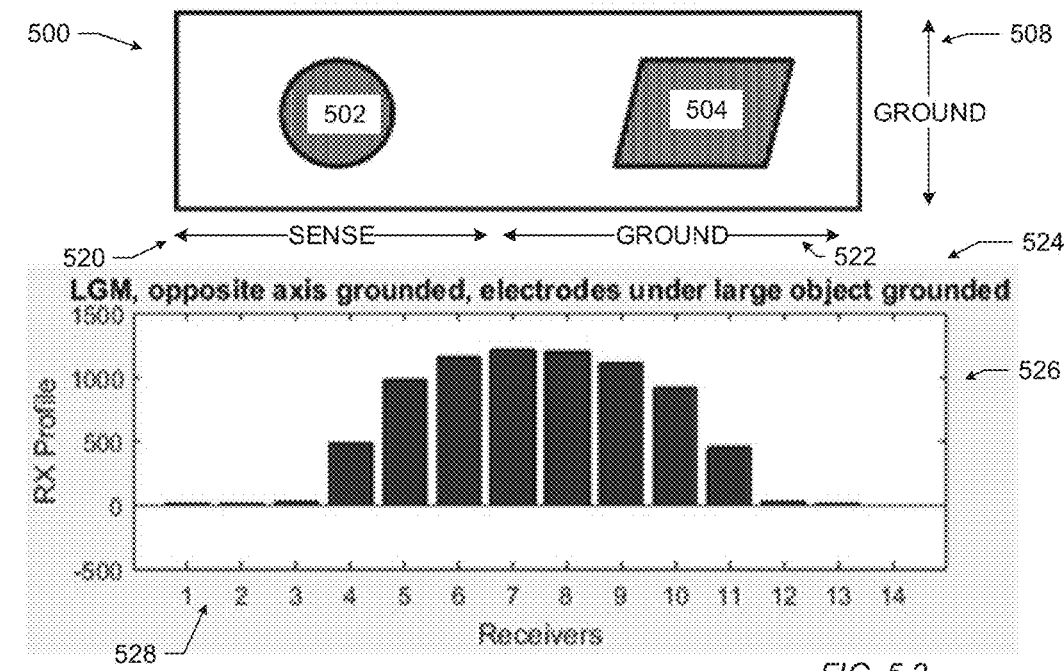
FIG. 5.2

INPUT OBJECT BASED INCREASE IN GROUND MASS STATE

FIELD

This invention generally relates to electronic devices, and more specifically, to improving grounding conditions of the electronic devices.

BACKGROUND

Input devices, including proximity sensor devices (e.g., touchpads or touch sensor devices), are widely used in a variety of electronic systems. A proximity sensor device may include a sensing region, often demarked by a surface, in which the proximity sensor device determines the presence, location and/or motion of one or more input objects. Proximity sensor devices may be used to provide interfaces for the electronic system. For example, proximity sensor devices may be used as input devices for larger computing systems (such as opaque touchpads integrated in, or peripheral to, notebook or desktop computers). Proximity sensor devices are also often used in smaller computing systems (such as touch screens integrated in cellular phones).

The detection of input objects in the sensing region is performed using sensor electrodes. The sensor electrodes are driven with sensing signals and capacitive measurements are acquired from the sensor electrodes. In some scenarios, the input device is in a low ground mass state. For example, the input device may be placed on an insulating surface and not have an electrical path to ground. When the input device is in a low ground mass state, detecting the presence of any input objects in the sensing region may be a challenge.

SUMMARY

A processing system for increasing ground mass state of an input device is disclosed. The processing system includes sensor circuitry and processing circuitry coupled to the sensor circuitry. The sensor circuitry is configured to drive sensor electrodes to acquire first measurements of a sensing region of the input device, and drive a first subset of the sensor electrodes while a second subset is coupled to device ground to acquire second measurements of a portion of the sensing region. The processing circuitry is configured to determine a location of an input object in the sensing region using the first measurements, determine the second subset corresponds to the location of the first input object in the sensing region, and couple the second subset to device ground when driving the first subset in response to the second subset corresponding to the location of the first input object.

A method for increasing a ground mass state of an input device is disclosed. The method includes acquiring, while driving sensor electrodes, first measurements of a sensing region of the input device, determining a location of a first input object in the sensing region using the measurements, determining a first subset of the sensor electrodes corresponding to the location. The method further includes acquiring a second measurements of the sensing region while driving a second subset when the first subset is coupled to device ground, the first subset being coupled to device ground in response to the first subset corresponding to the location of the first input object.

An input device that includes sensor electrodes and a processing system is disclosed. The processing system includes circuitry for acquiring, while driving sensor electrodes, first measurements of a sensing region of the input device, determining a location of a first input object in the sensing region using the measurements, determining a first subset of the sensor electrodes corresponding to the location. The circuitry is further for acquiring a second measurements of the sensing region while driving a second subset when the first subset is coupled to device ground, the first subset being coupled to device ground in response to the first subset corresponding to the location of the first input object.

Other aspects of the invention will be apparent from the following description and the appended claims.

BRIEF DESCRIPTION OF DRAWINGS

Exemplary embodiments will hereinafter be described in conjunction with the appended drawings, where like designations denote like elements, and:

FIGS. 5.1 and 5.2 show example diagrams of the sensing region and corresponding graphs in accordance with one or more embodiments.

DETAILED DESCRIPTION

Figure 1:
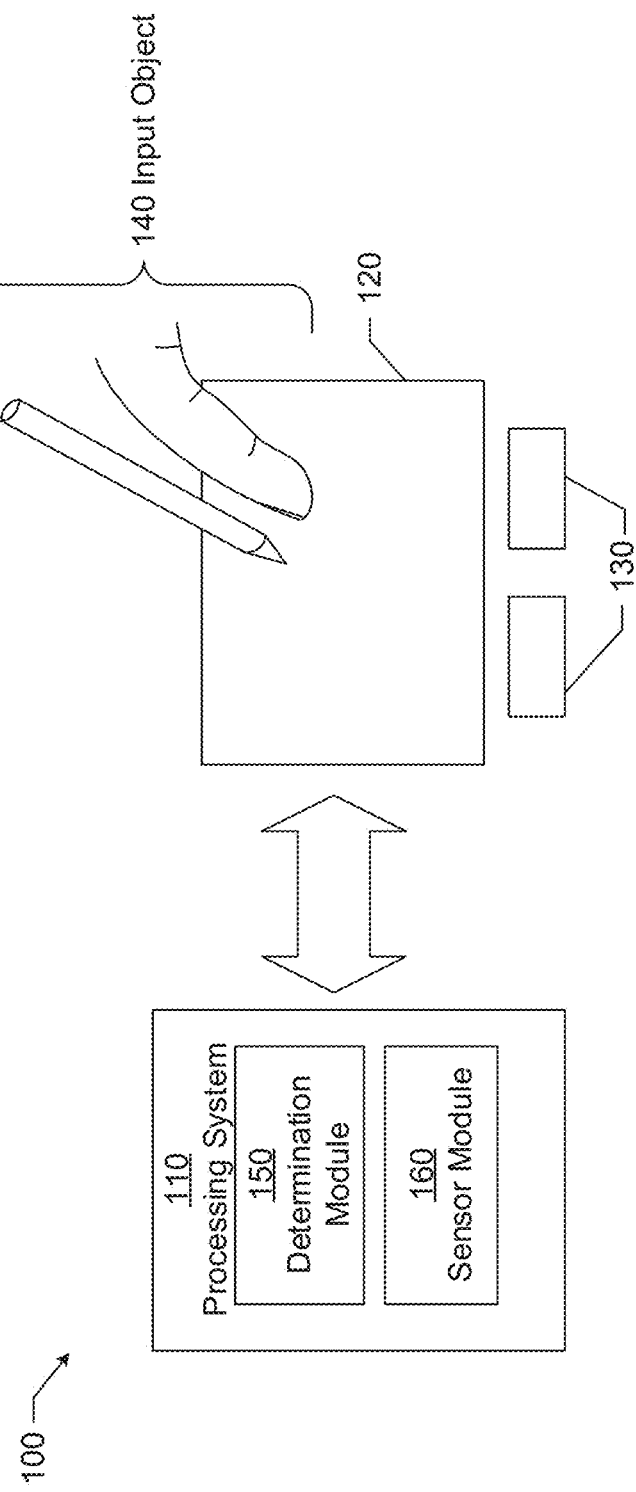
FIG. 1 shows a block diagram of an example system that includes an input device in accordance with an embodiment.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments described herein provide input devices and methods that facilitate improved usability. In particular, one or more embodiments are directed to improving grounding condition of the input device by connecting selected sensor electrodes to ground when an input object is detected. Insufficient grounding or a low ground mass state results in undesirable signal artifacts. In particular, measurements from the sensor electrodes may have several peaks corresponding to input object that do not exist, negative values for measured capacitance, and lower values than expected for input objects that are present. Low ground mass state occurs when a capacitance input device does not have sufficient ground. For example, an input device may not have sufficient ground when the input device is on a non-conductive insulated surface and is not connected to the ground.

The low ground mass problem may be further compounded when a large input object is near a small input object. For example, an input object may be obfuscated by one or more other input objects in the sensing region, even when the corresponding sensor electrodes of the other input object(s) are guarded at the location of the other input object(s). The large input object may thus obscure the small input object. More specifically, amplitude of a signal decreases in proportion to the number of electrodes that are coupling to the input object.

Accordingly, the presence of multiple input objects when the input device is in a low ground mass state may pose a challenge to detect and obtain positional information for one or more of the input objects. In one embodiment of this disclosure, sensor electrodes coupling to a selected input object are identified and grounded. By grounding the sensor electrodes connected to a selected input object, one or more embodiments may not only mitigate the effects of multiple input objects present in the sensing region, but also increase the ground mass state of the input device. When the selected input object is grounded, additional capacitive measurements of the sensing region are acquired and used to obtain positional information of an input object in the sensing region.

Turning now to the figures, FIG. 1 shows a block diagram of an example input device (100), in accordance with various embodiments. The input device (100) may be configured to provide input to an electronic system (not shown for simplicity). As used in this document, the term "electronic system" (or "electronic device") broadly refers to any system capable of electronically processing information. Example electronic system may include personal computers (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system can be a host or a slave to the input device (100).

The input device (100) may be implemented as a physical part of the electronic system. In the alternative, the input device (100) may be physically separate from the electronic system. The input device (100) may be coupled to (and communicate with) components of the electronic system using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (such as a "touchpad" or a "touch sensor device") configured to sense input provided by one or more input objects (140) in a sensing region (120). Example input objects include fingers and styli. The sensing region (120) may encompass any space above, around, in and/or near the input device (100) in which the input device (100) is able to detect user input (e.g., provided by one or more input objects (140)). The sizes, shapes, and locations of particular sensing regions may vary depending on actual implementations.

In some embodiments, the sensing region (120) extends from a surface of the input device (100) in one or more directions in space, for example, until a signal-to-noise ratio (SNR) of the sensors fall below a threshold suitable for object detection. For example, the distance to which the sensing region (120) extends in a particular direction may be on the order of less than a millimeter, millimeters, centimeters, or more, and may vary with the type of sensing technology used and/or accuracy desired. In some embodiments, the sensing region (120) may detect inputs involving no physical contact with any surfaces of the input device (100), contact with an input surface (e.g. a touch surface) of the input device (100), contact with an input surface of the input device (100) coupled with some amount of applied force or pressure, and/or a combination thereof.

In various embodiments, input surfaces may be provided by surfaces of a housing of the input device (100) within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

The input device (100) may utilize various sensing technologies to detect user input. Example sending technologies may include resistive, inductive, capacitive, elastive, magnetic, acoustic, ultrasonic, and optical sensing technologies. In some embodiments, the input device (100) may include one or more sensing elements configured to implement the various sensing technologies.

In some embodiments, the input device (100) may implement resistive sensing technologies to detect user input. For example, the sensing region (120) may be formed by a flexible and conductive first layer separated by one or more spacer elements from a conductive second layer. The sensing region (120) may detect user input by creating one or more voltage gradients are created across the layers and sensing when the first layer is brought in contact with the second layer. More specifically, pressing the flexible first layer may deflect it sufficiently to create electrical contact between the layers, resulting in voltage outputs reflective of the point(s) of contact between the layers. These voltage outputs may be used to determine positional information of the detected inputs.

In other embodiments, the input device (100) may utilize inductive sensing technologies to detect user inputs. For example, the sensing region (120) may include one or more sensing elements configured to pick up loop currents induced by a resonating coil or pair of coils. The input device (100) may then detect user input based on a combination of the magnitude, phase, and/or frequency of the currents. The characteristics of the loop currents may further be used to determine positional information about the detected inputs.

In some embodiments, the input device (100) may utilize capacitive sensing technologies to detect user input. For example, the sensing region (120) may input one or more capacitive sensing elements (e.g., sensor electrodes) to create an electric field. The input device (100) may detect inputs based on changes in capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") and/or "mutual capacitance") (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device (100) may implement absolute capacitance sensing by modulating sensor electrodes with respect to a reference voltage (e.g., system ground), and detecting the capacitive coupling between the sensor electrodes and input objects. The reference voltage may be a substantially constant voltage, a varying voltage, or corresponds to a system ground. Measurements acquired using absolute capacitance sensing methods may be referred to as absolute capacitive measurements.

Transcapacitance sending methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device (100) may implement transcapacitance sensing by detecting the capacitive coupling between one or more transmitter sensor electrodes (also "transmitter electrodes" or "transmitter") and one or more receiver sensor electrodes (also "receiver electrodes" or "receiver"). Signals on the transmitter sensor electrodes may be modulated relative to a reference voltage (e.g., system ground) to transmit transmitter signals while receiver sensor electrodes may be held at a substantially constant voltage relative to the reference voltage to receive resulting signals. The reference voltage may be a substantially constant voltage or system ground. The resulting signal may be affected by environmental interference (e.g., other electromagnetic signals and/or objects in contact with, or in close proximity to, the sensor electrodes). Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

The processing system (110) may be configured to operate the hardware of the input device (100) to detect input in the sensing region (120). The processing system (110) may include parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may be implemented in hardware, firmware, software, or a combination thereof. In some embodiments, the processing system (110) may include processing circuitry (150) configured to determine when at least one input object is in a sensing region, determine signal to noise ratio, determine positional information of an input object, identify a gesture, determine an action to perform based on the gesture, a combination of gestures or other information, and/or perform other operations. In some embodiments, the processing system (110) may include sensor circuitry (160) configured to drive the sensing elements to transmit transmitter signals and receive the resulting signals. In some embodiments, the sensor circuitry (160) may include sensory circuitry that is coupled to the sensing elements. The sensory circuitry may include, for example, a transmitter module including transmitter circuitry that is coupled to a transmitting portion of the sensing elements and a receiver module including receiver circuitry coupled to a receiving portion of the sensing elements.

Although FIG. 1 shows only processing circuitry (150) and sensor circuitry (160), alternative or additional modules may exist in accordance with one or more embodiments of the disclosure. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
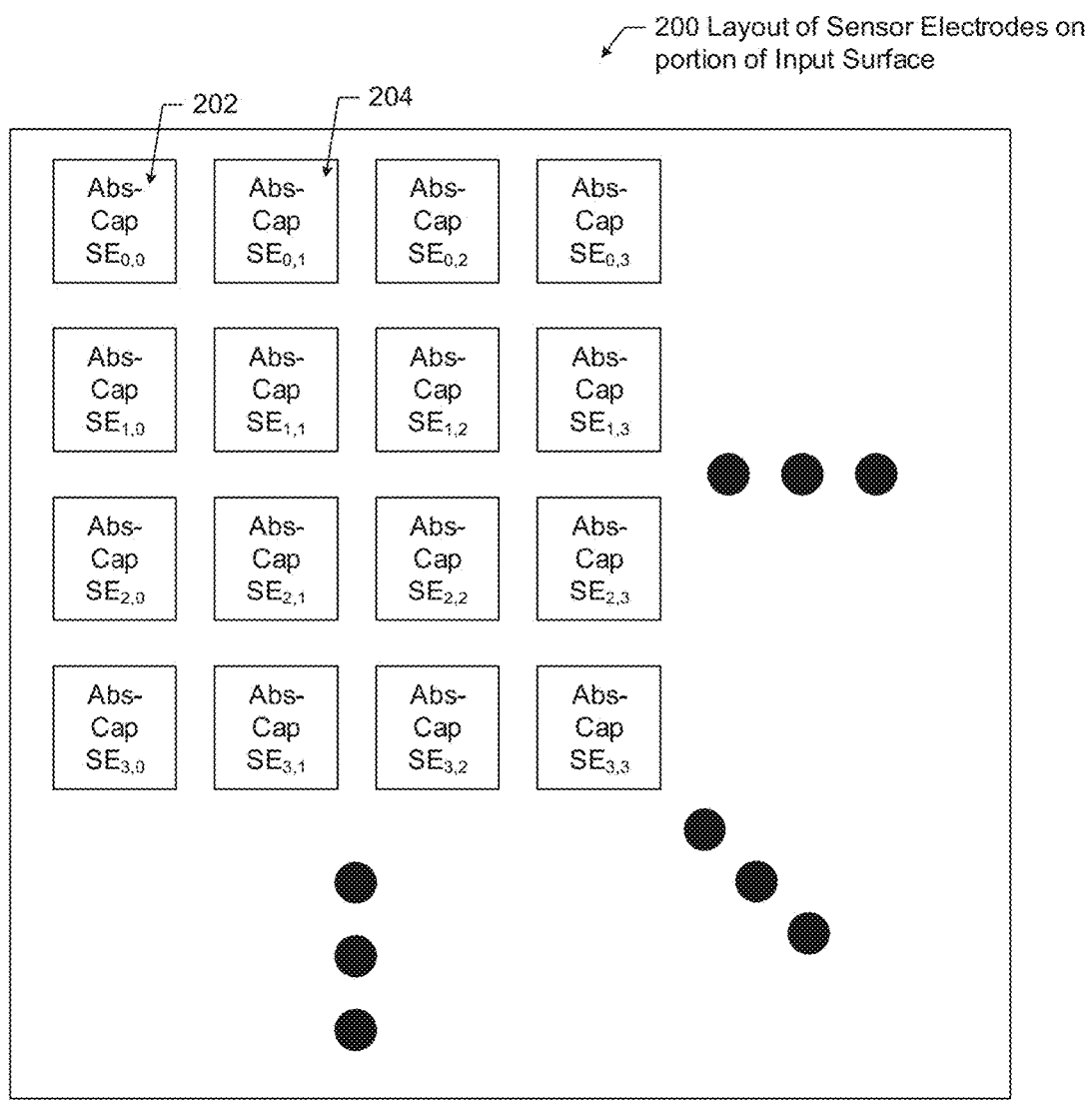
FIG. 2 shows a block diagram of an example layout of sensor electrodes on the input device in accordance with one or more embodiments.

FIG. 2 shows a block diagram of an example layout of sensor electrodes on a portion of the input surface (200) in accordance with one or more embodiments. The sensor electrodes are shown as absolute capacitive sensor electrodes (Abs-Cap SE) arranged in an array (e.g. a grid pattern). Each absolute capacitive sensor electrode (e.g., Abs-Cap $SE_{0,0}$ (202), Abs-Cap $SE_{0,1}$ (204)) may be coupled to a unique routing trace (not shown) and to the processing system. As such, each sensor electrode may be individually driven. Driving a sensor electrode may include modulating the voltage on the sensor electrode to acquire absolute capacitive measurement of the sensor electrode. When voltage on each sensor electrode is modulated (e.g., the voltage on the sensor electrode is modulated), an absolute capacitive image may be generated. In the absolute capacitive image, each modulated sensor electrode generates an absolute capacitive measurement value for a pixel in the image. When voltages on all sensor electrodes are modulated, a complete absolute capacitive image of the sensing region may be generated.

In some embodiments, the sensor electrodes may be in-cell sensor electrodes. In cell-sensor electrodes are sensor electrodes that cause the display of color on the input surface (200) by creating a voltage differential. Thus, in at least some embodiments, at least a portion of the sensor electrodes that cause the display of color on the input surface may be used to acquire capacitive measurements of input objects in the sensing region of the input surface.

Although FIG. 2 shows a grid layout of sensor electrodes, the sensor electrodes may be arranged in other patterns. For example, the sensor electrode array may include a column sensor electrode capacitively coupled with each of a plurality of row sensor electrodes. For another example, the sensor electrode array may include a row sensor electrode capacitively coupled with each of a plurality of column sensor electrodes. In some embodiments, each row may include a single sensor electrode and each column may include a single sensor electrode. In such a scenario, absolute capacitive measurements may be used to generate one or more profile of the sensing region. Each row in a first profile has a single absolute capacitive measurement. Each column of a second profile has a single absolute capacitive measurement. Acquiring the profiles is performed using absolute capacitive (i.e., self-capacitive) sensing.

Absolute capacitive sensing is performed by the sensor circuitry modulating sensing signals on the sensor electrodes with respect to a reference voltage in order to determine the self-capacitance of the sensor electrodes. Based on the modulation, the sensor circuitry detects absolute capacitive measurements of each sensor electrode. The absolute capacitance may be affected by the presence of input objects in the sensing region and interference. In one or more embodiments, absolute capacitive sensing may create an absolute capacitive image or profiles (i.e., absolute capacitive profiles) of the sensing region. For example, if the sensor electrodes are an Advanced Matrix Pad (AMP) sensor as shown in FIG. 2, then a separate sensor electrode may exist for each location in a grid on the sensing region. In such a scenario, the self-capacitive image has a self-capacitive measurement for each location of the grid. By way of an example in which a single separate sensor electrode may exist for each row and each column of the sensing region, profiles of the sensing region are acquired. In such a scenario, each row may have a single absolute capacitive measurement in a first profile and each column may have a single absolute capacitive measurement value in a second profile.

In some embodiments, the sensor electrodes may be used to perform mutual capacitive sensing. For example, a sensor electrode may be a transmitter electrode and the adjacent sensor electrode may be a receiver electrode to perform the mutual capacitive sensing. During mutual capacitive sensing, the sensor circuitry drives the transmitter sensor electrodes with transmitter signals and receives resulting signals with receiver transmitter electrodes. The resulting signals correspond to the capacitance between the transmitter electrodes and the receiver electrodes as affected by the presence of any input object and interference near intersection of the transmitter electrode and receiver electrode. The sensor circuitry is configured to acquire mutual capacitive measurements of the resulting signals. In one or more embodiments, the mutual capacitive measurements may create a mutual capacitive image of the sensing region. A mutual capacitive image has a mutual capacitive measurement for each intersection of transmitter electrodes and receiver electrodes. Other variations of the mutual capacitive sensing may also be used.

Although the above discusses two variations for layouts of sensor electrodes, other layouts may be used with the disclosed embodiments. For example, embodiments may be applied to radial sensor patterns, planar sensor patterns and other arrangements of sensor electrodes.

Figure 3:
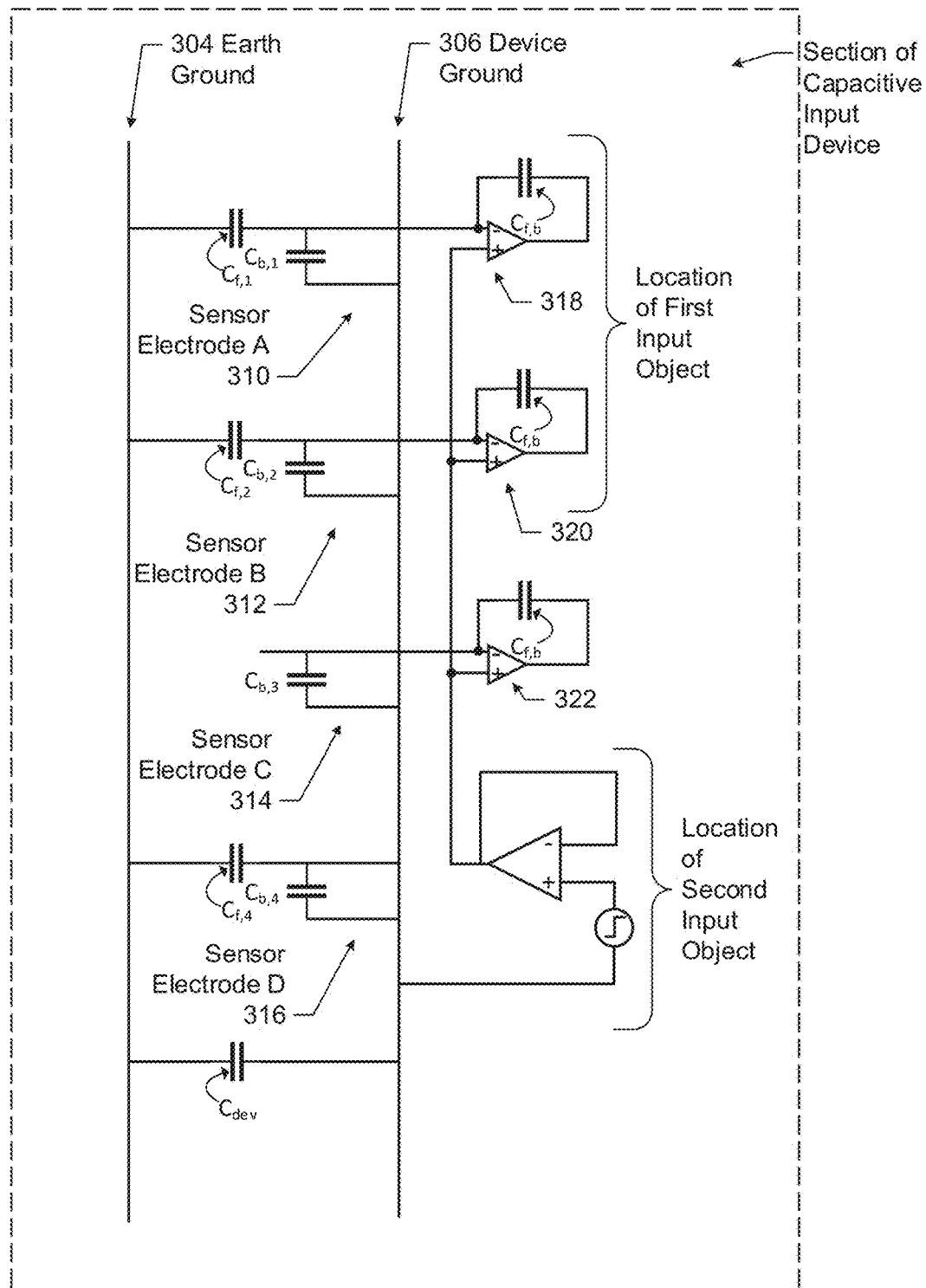
FIG. 3 illustrates an example circuit diagram in accordance with one or more embodiments.

FIG. 3 illustrates an example circuit diagram in accordance with one or more embodiments. In particular, FIG. 3 shows a circuit formed by four sensor electrodes in contact with two input objects. A first input object is located at sensor electrode A (310) and sensor electrode B (312). Thus, capacitances $C_{f,1}$ and $C_{f,2}$, respectively, exist between device ground (306) and earth ground (304) through the first input object. As shown, no input object is located at sensor electrode C (314). A second input object is located at sensor electrode D (316). Background capacitances ($C_{b,1}$, $C_{b,2}$, $C_{b,3}$, $C_{b,4}$) may exist at each sensor electrode (sensor electrode A (310), sensor electrode B (312), sensor electrode C (314), and sensor electrode D (316)), respectively, due to external noise. Additionally, a capacitance $C_{dev}$ may exist between the device (e.g., device ground (306)) and earth ground (304). When $C_{dev}$ value is large, the device may be considered to be well grounded. However, when $C_{dev}$ value is small, the device may be considered to be in a low ground mass state. Various methods may be used to determine whether a device is in low ground mass state (e.g., whether $C_{dev}$ is small or large).

For example, the ground mass state may be determined as a function of the capacitance between the input object and all sensor electrodes, the capacitance between input object and transmitter electrodes, the capacitance between input object and receiver electrodes, and the free space capacitive coupling in series between the sensor device and the user. The ground mass state may be determined based on the signal to noise ratio. If the signal to noise ratio of the input device is less than a threshold, then the determination may be made that the input device is detected to be in a low ground mass state. As another example, low ground mass state may be detected based on negative peaks (e.g., localized minima in negative measurements) in the capacitive image. A negative measurement is an opposite measurement of the measurement when an input object is present. Because negative capacitance does not exist, a negative peak may be indicative of re-transmission caused by low ground mass state.

In one embodiment, sensor electrode A (310), sensor electrode B (312), and sensor electrode C (314) are driven to perform absolute capacitive sensing as denoted by circuit segments (318, 320, and 322). While sensor electrode A (310) and sensor electrode B (312) are being driven, sensor electrode D (316) is not driven. However, because a capacitance $C_{f,4}$ exists between the earth ground (304) and sensor electrode D (316) through the second input object (i.e., the user is connected to the input object and the earth ground (304)), sensor electrode D (316) is still affected by the presence of the second input object. By connecting sensor electrode D (316) to the device ground (306) when the second input object is present, an additional electrical pathway is created between earth ground (304) and device ground (306) via the second input object and sensor electrode D (316), thereby increasing the ground mass state of the device. Increasing the ground mass state of the input device allows more regular capacitive measurements of the remaining sensor electrodes, and thus more accurately reflects the presence of an input object in the sensing region.

In one embodiment, the sensor electrodes that are not currently driven is connected to device ground (306) using a multiplexor (not shown). Each sensor electrode may have a separate and distinct multiplexor that is configured to switch between a driving mode and a grounded mode. The multiplexor is configured to couple a corresponding sensor electrode to device ground based on input from the processing circuitry. In the driving mode, the sensor electrode is driven and capacitive measurements are acquired using the sensor electrode. In the grounded mode, the sensor electrode is coupled to device ground (306). Thus, in the grounded mode, an input object in contact with the sensor electrode that is not currently driven has the effect of increasing the ground mass state of the input device. In some embodiments, subsets of sensor electrodes are connected to the same multiplexor that switches between grounded mode and driving mode. Other techniques for connecting the sensor electrodes to device ground (306) may be used.

In some embodiments, a sensor electrode is either in a grounded mode or in a driving mode. In other embodiments, a sensor electrode is either in a grounded mode, in a driving mode, or in a guarded mode. In the guarded mode, a sensor electrode may be guarded when the sensor electrode is not driven to minimize the effects of any input object that is capacitively coupled to the sensor electrode. In some embodiments, the decision as to whether to set sensor electrodes that are not driven into grounded mode or guarded mode is based, at least in part, on: whether the input device is in a low ground mass state (i.e., $C_{dev}$ is less than a threshold), whether any input object exists that is proximate to and capacitively coupled to the sensor electrode that is not driven, a size of an input object located at the sensor electrode (e.g., in the sensing region detectable by the sensor electrode), and other factors.

Figure 4:
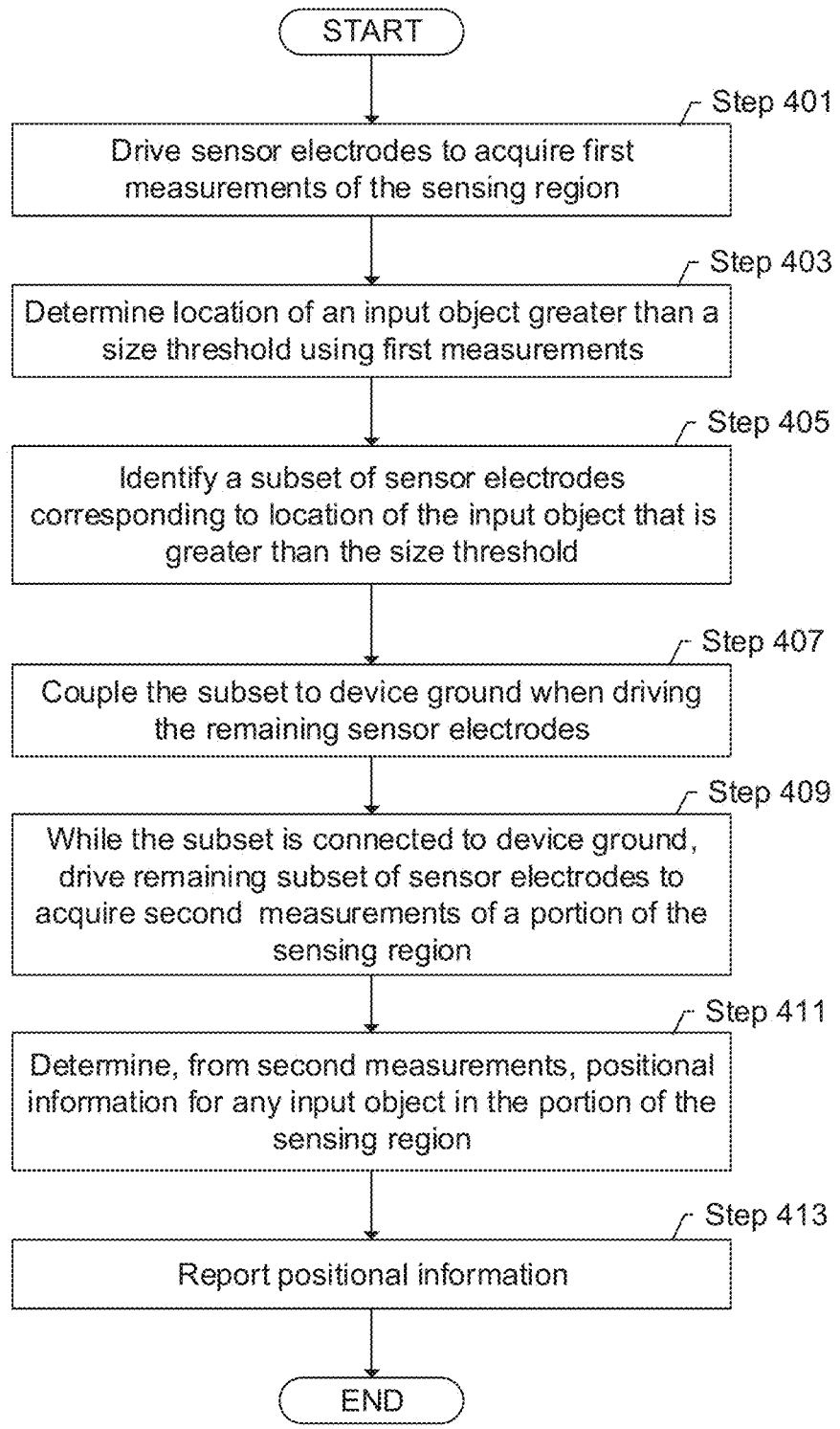
FIG. 4 illustrates an example flowchart in accordance with one or more embodiments.

FIG. 4 illustrates an example flowchart in accordance with one or more embodiments. While the various steps are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of this disclosure. By way of an example, determination steps may not require a processor to process an instruction unless an interrupt is received to signify that a condition exists. As another example, determination steps may be performed by performing a test, such as checking a data value to test whether the value is consistent with the tested condition.

In one embodiment, the sensor electrode may be set to grounded state based, at least in part, on an input object being capacitively coupled to the sensor electrodes. Other factors may be used in addition to or instead of the factor shown in FIG. 4. For example, the other factors may include the grounding state of the input device. In such a scenario, some of the steps of FIG. 4 may be removed.

In Step 401, the sensor electrodes are driven to acquire a first measurements of the sensing region. For example, the measurements may be acquired using the sensor circuitry and sensor electrodes. In the example, the sensor circuitry may drive or modulate the sensor electrodes with respect to a reference voltage. Based on the modulating, the sensor circuitry may measure the absolute capacitance of the sensor electrodes, which may be affected by an input object and/or background capacitance. By way of another example, mutual capacitance measurements may be acquired by the sensor circuitry driving transmitter electrodes with transmitter signals and receiving resulting signals using receiver electrodes. Like absolute capacitance, the resulting signals are affected by input objects and/or background capacitance. The change in capacitance reflects the amount of the resulting signal that is attributable to an input object. Preprocessing may be performed on the measurements. For example, the preprocessing may include applying temporal and/or spatial filters to the measurements, subtract a baseline from the measurements, or perform other suitable operations.

In one or more embodiments, sensor electrodes in a subset of sensor electrodes may be driven concurrently. For example, sensors in a subset of sensor electrodes are driven concurrently. The next subset of sensor electrodes is then driven concurrently. Thus, during each time period, only a portion of the sensor electrodes are driven. To drive multiple sensor electrodes concurrently, code division multiplexing may be used. In one or more embodiments, resulting measurements from driving the different subsets are combined to generate an image or profiles of the sensing region. Each measurement value is attributed to the location of the image or profile that matches the locations of the input object.

In Step 403, a location of an input object is determined using the measurements, the size of the input object being greater than a threshold size. Locations may be determined based, at least in part, on the measurements satisfying a detection threshold. In particular, pre-processing may be performed to subtract a baseline, and mitigate for any artifacts in the sensing region. The magnitude of the pre-processed measurements may be compared to a detection threshold to determine whether the magnitude of the measurements is greater than the detection threshold. If a measurement satisfies the detection threshold, then the measurement is determined to correspond to a location of a possible input object. The size of the input object may be determined based on the number of adjacent measurement values that satisfy the detection threshold. Various techniques may be used to determine the location and size of an input object.

In Step 405, a subset of the sensor electrodes corresponding to the location of the input object that is greater than the size threshold is identified. The subset of sensor electrodes are the sensor electrodes used to detect the input object that is greater than the size threshold. Thus, the subset of sensor electrodes that are identified correspond to the sensor electrodes having the criteria of the acquired measurements matching the detection threshold and are proximate to an input object satisfying the size threshold.

In Step 407, the identified subset is coupled to device ground when driving the remaining sensor electrodes. The subset identified in Step 405 is set to be in grounded mode when not driven. Remaining sensor electrodes may be set to guarded mode when not driven. Coupling the identified subset to device ground may be performed by sending an electrical signal to the multiplexor to have the multiplexor close the connection between device ground and each sensor electrode in the subset.

In Step 409, while the subset is coupled to device ground, the remaining subset of sensor electrodes are driven to acquire second measurements of the portion of the sensing region. Driving the remaining subset of sensor electrodes may be performed in a same or similar manner to Step 401 of FIG. 4. A profile or image of only the portion of the sensing region is acquired based on the second measurements. Because the subset is coupled the device ground, the subset is part of a path to increase the ground mass state of the input device. Thus, rather than the large input object obfuscating other input objects that are in the sensing region, the large input object is not detected, and the subset that is proximate to the large input object increases the quality of the second measurements.

In Step 411, positional information is determined for any input object in the portion of the sensing region. Various processing techniques may be used to determine positional information. For example, the measurements satisfying the detection threshold may be used to determine a two-dimensional location of the input object. The magnitude of the measurements may be used to determine the position of the input object in the third dimension. The slope of the measurements may be used to determine the size, angle, and other information about the input object. Comparing the measurements with previous measurements for the subset may be used to determine direction and speed of the input object across the sensing region. Other techniques for determining positional information may be used.

In Step 413, the positional information is reported. Reporting the positional information may be performed by the processing system transmitting the positional information to the central processing unit. Reporting the positional information may include notifying a software application about the positional information. A corresponding user interface action may be performed based on the positional information. For example, a state of the input device may change.

In FIG. 4, the size of an input object is used as a factor in determining whether to set a sensor electrode to a grounded state. An example in which the size is relevant is when a large input object and a small input object is concurrently present in the sensing region. The existence of the large input object may obfuscate the small input object, especially in a low ground mass environment. By way of a more specific example, consider the scenario in which a user is using a stylus on the sensing region. While using the stylus, the side of the user's hand is in contact with the sensing region (e.g., the user is resting a portion of the user's palm on the sensing region). In a low ground mass environment, because of the lower signal level of the stylus as compared to the user's hand, the stylus may be difficult to detect. Using the technique of FIG. 4, first measurements are acquired of the sensing region. Based on the first measurements, the large input object corresponding to the portion of the user's hand is identified, and the corresponding sensor electrodes are coupled to device ground. Thus, the sensor electrodes proximate to the portion of the user's hand has the effect of increasing the ground mass state of the input device. The remaining sensor electrodes are driven to acquire second measurements. With the sensor electrodes proximate to the portion of the user's hand helping the second measurements by increasing the ground mass state rather than hindering the second measurements by obfuscating small objects, the location of the stylus is more readily identified. At this stage, the user's hand may be suppressed when reporting the positional information of the stylus. Thus, the input device can properly respond to the user's hand.

FIGS. 5.1 and 5.2 are example diagrams of the sensing region and corresponding graphs in accordance with one or more embodiments of the invention. The following example is for explanatory purposes only and not intended to limit the scope of the invention.

In the example shown in FIG. 5.1, two input objects (circle object (502), trapezoidal object (504)) are in the sensing region (500). Absolute capacitive sensing is performed, whereby sensing is performed on the horizontal axis (506) and the vertical axis (508) is grounded. Turning to the graph (510), the vertical axis (512) shows the value of the measurements while the horizontal axis (514) matches the horizontal axis (506) of the sensing region (500). As shown in the corresponding graph (510), the measurement values have a maximum value of 400 femtofarads (fF).

Turning to the example shown in FIG. 5.2, two input objects (circle object (502), trapezoidal object (504)) are in the sensing region (500). Similar to FIG. 5.1, absolute capacitive sensing is performed in FIG. 5.2. However, sensing is performed on a portion of the horizontal axis (520), while the portion (522) under the trapezoidal object (504) and the vertical axis (508) are grounded. Turning to the graph (524), the vertical axis (526) shows the value of the measurements while the horizontal axis (528) matches the portion of the horizontal axis (520) of the sensing region (500). As shown in the corresponding graph (524), the measurement values have a maximum value of 1500 fF. Thus, by grounding the area under the trapezoidal object (504), the values of the measurements from absolute capacitive sensing under the circle object (502) increases substantially.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for increasing ground mass state of an input device, the processing system comprising:
sensor circuitry configured to:
drive a plurality of sensor electrodes to acquire a first plurality of measurements of a sensing region of the input device, and
drive a first subset of the plurality of sensor electrodes while a second subset of the plurality of sensor electrodes is coupled to device ground to acquire a second plurality of measurements of a portion of the sensing region; and
processing circuitry coupled to the sensor circuitry and configured to:
determine a location of a first input object in the sensing region using the first plurality of measurements to obtain a determined location,
determine the second subset corresponds to the determined location of the first input object in the sensing region,
couple the second subset to device ground when driving the first subset in response to determining that the second subset corresponds to the determined location of the first input object, and
determine positional information of a second input object from the second plurality of measurements, the second input object being in the portion of the sensing region.

2. The processing system of claim 1, wherein driving the plurality of sensor electrodes comprises modulating the plurality of sensor electrodes with respect to a reference voltage to acquire a plurality of absolute capacitive measurements, wherein the plurality of absolute capacitive measurements is the first plurality of measurements.

3. The processing system of claim 1, wherein driving the plurality of sensor electrodes comprises driving a plurality of transmitter electrodes with transmitter signals and receiving resulting signals using a plurality of receiver electrodes to acquire a plurality of mutual capacitive measurements, wherein the plurality of sensor electrodes comprises the plurality of transmitter electrodes and the plurality of receiver electrodes, and wherein the plurality of mutual capacitive measurements are the first plurality of measurements.

4. The processing system of claim 1, wherein the plurality of sensor electrodes is arranged in a grid pattern.

5. The processing system of claim 1, wherein the processing system is further configured to:
determine a size of the first input object,
wherein coupling the second subset to device ground when driving the first subset is further in response to the size of the first input object being greater than a size threshold.

6. The processing system of claim 1, wherein the processing system is configured to send an electrical signal to a multiplexor to couple the second subset to device ground.

7. A method for increasing a ground mass state of an input device, the method comprising:
acquiring, while driving a plurality of sensor electrodes, a first plurality of measurements of a sensing region of the input device,
determining a location of a first input object in the sensing region using the first plurality of measurements to obtain a determined location,
determining a first subset of the plurality of sensor electrodes corresponding to the determined location of the first input object in the sensing region,
acquiring a second plurality of measurements of a portion of the sensing region while driving a second subset of the plurality of sensor electrodes when the first subset is coupled to device ground, the first subset being coupled to device ground in response to determining that the first subset corresponds to the determined location of the first input object, and
determining positional information of a second input object from the second plurality of measurements, the second input object being in the portion of the sensing region.

8. The method of claim 7, wherein the first plurality of measurements is a plurality of absolute capacitive measurements.

9. The method of claim 7, wherein the first plurality of measurements is a plurality of mutual capacitive measurements.

10. The method of claim 7, wherein the plurality of sensor electrodes is arranged in a grid pattern.

11. The method of claim 7, further comprising:
determining a size of the first input object,
wherein the second subset is coupled to device ground when driving the first subset is further in response to the size of the first input object being greater than a size threshold.

12. The method of claim 7, further comprising:
sending an electrical signal to a multiplexor to couple the second subset to device ground.

13. An input device comprising:
a plurality of sensor electrodes; and
processing system coupled to the plurality of sensor electrodes and comprising circuitry for:
acquiring, while driving the plurality of sensor electrodes, a first plurality of measurements of a sensing region of an input device,
determining a location of a first input object in the sensing region using the first plurality of measurements to obtain a determined location,
determine a first subset of the plurality of sensor electrodes corresponding to the determined location of the first input object in the sensing region,
acquire a second plurality of measurements of a portion of the sensing region while driving a second subset of the plurality of sensor electrodes when the first subset is coupled to device ground, the first subset being coupled to device ground in response to determining that the first subset corresponds to the determined location of the first input object, and
determine positional information of a second input object from the second plurality of measurements, the second input object being in the portion of the sensing region.

14. The input device of claim 13, further comprising a multiplexor for each of the plurality of sensor electrodes, the multiplexor further configured to couple a corresponding sensor electrode of the plurality of sensor electrodes to device ground based on input from the processing circuitry.

15. The input device of claim 13, wherein the plurality of sensor electrodes is arranged in a grid pattern.

16. The input device of claim 13, wherein the plurality of sensor electrodes comprises a plurality of transmitter electrodes and a plurality of receiver electrodes, and wherein the first plurality of measurements are a plurality of mutual capacitive measurements for the mutual capacitance between the plurality of transmitter electrodes and the plurality of receiver electrodes.

17. The input device of claim 13, wherein the processing system is further for:
  determining a size of the first input object,
  wherein the second subset is coupled to device ground when driving the first subset is further in response to the size of the first input object being greater than a size threshold.

* * * * *